United States Patent [19]

Weng et al.

[11] Patent Number: 5,365,382
[45] Date of Patent: Nov. 15, 1994

[54] SYNCHRONIZATION TO DIFFERENT FIELDS IN A STORAGE DEVICE

[75] Inventors: Lih-Jyh Weng, Shrewsbury, Mass.; Michael E. Kastner, Broomfield, Colo.; Bruce Leshay, West Boylston, Mass.

[73] Assignee: Digital Equipment Corporation, Maynard, Mass.

[21] Appl. No.: 64,286

[22] Filed: May 18, 1993

[51] Int. Cl.⁵ ............................................. G11B 5/09
[52] U.S. Cl. ........................................ 360/51; 360/53
[58] Field of Search ...................... 360/51, 46, 49, 61, 360/53, 31; 369/59, 53, 54, 114, 48; 370/105.01, 105.04; 375/116, 114

[56] References Cited

U.S. PATENT DOCUMENTS

| | | | |
|---|---|---|---|
| 3,916,440 | 10/1975 | Irwin | 360/50 |
| 4,081,844 | 3/1978 | Devore et al. | 360/48 |
| 4,470,148 | 9/1984 | Mott et al. | 375/114 X |
| 4,713,802 | 12/1987 | Kobatov et al. | 369/59 |
| 4,719,523 | 1/1988 | Kutaragi | 360/51 |
| 4,734,901 | 3/1988 | Murakami | 369/59 |
| 4,748,611 | 5/1988 | Tsuyoshi et al. | 369/59 |
| 4,768,108 | 8/1988 | Higurashi | 369/48 X |
| 4,862,443 | 8/1989 | Tsuji et al. | 369/59 |
| 4,907,215 | 3/1990 | Sako et al. | 369/59 |
| 4,937,843 | 6/1990 | Takemoto | 375/116 |
| 4,977,472 | 12/1990 | Volz et al. | 360/78 |
| 4,987,355 | 1/1991 | Leaper et al. | 318/561 |
| 5,036,408 | 7/1991 | Leis et al. | 360/48 |
| 5,054,035 | 10/1991 | Tarallo et al. | 375/116 X |
| 5,109,393 | 4/1992 | Saegusa | 375/116 X |
| 5,123,013 | 6/1992 | Hirayama | 375/116 X |
| 5,226,026 | 7/1993 | Oshiba | 369/48 |
| 5,229,986 | 7/1993 | Mizokami et al. | 369/59 |

*Primary Examiner*—Donald Hajec
*Assistant Examiner*—Le Thien Minh
*Attorney, Agent, or Firm*—James F. Thompson; Ronald C. Hudgens; Albert P. Cefalo

[57] ABSTRACT

A method and apparatus for identifying and synchronizing to two different fields in a disk drive employs different synchronization or "sync" patterns to reduce the chances of mis-identifying and false-identifying a field. Two very distinct synchronization patterns have been found that satisfy the d=1, k=7 run-length constraints of a data code used in the disk drive. During operation, one sync pattern is searched for to identify and synchronize to its associated field, then the field itself is read. This procedure is then repeated for the other sync pattern and its associated field. Also, the phase of a preamble preceding each sync character is established, so that the number of comparisons needed to find either sync character is reduced. A sync detector operates on cell pairs, and has a selector that selects which sync pattern to search for. The sync detector also has special features that enable it to find preamble and DC Erase fields in the disk cell stream.

17 Claims, 5 Drawing Sheets

SYNCHRONIZATION TO DIFFERENT FIELDS IN A STORAGE DEVICE

FIELD OF THE INVENTION

The invention is related to field of data storage devices such as magnetic or optical disk drives, and in particular to the synchronization of the operation of a device controller to various fields within a data stream obtained from the storage device.

BACKGROUND OF THE INVENTION

It is common practice to employ synchronization or "sync" characters in data storage devices that, when recognized in a data stream by an associated device controller, establish the boundaries of various fields within the data stream. These sync characters are commonly preceded by a preamble used to generate a sampling clock in the controller. A good example of this practice is shown in U.S. Pat. No. 5,036,408, issued Jul. 30, 1991 to Leis, et al., assigned to Digital Equipment Corporation, and entitled "High Efficiency Disk Format and Synchronization System" (hereinafter referred to as "Leis"). Therein is described a synchronization system that employs two sync characters: one in a header field used in reading the header, and another in a data field used in reading the data. These sync characters are traditionally copies of the same sync pattern. A single correlator designed to recognize the sync pattern is used to establish both header and data synchronization under the direction of a higher-level controller.

It is very important to establish synchronization in a reliable fashion. A device controller relies on sync detection to establish precisely where meaningful data resides in the data stream. If synchronization is done incorrectly, the retrieved data usually bears no resemblance to the correct data. This could have catastrophic results, for example, if it results in unpredictable behavior of the storage device. In such a case, valuable user data might be mistakenly destroyed. In other cases, the mistake is discovered before such catastrophic behavior, but the performance of the storage device has degraded at least temporarily. Such results are clearly best avoided.

Because of the need for reliable sync detection, then, the patterns used for sync characters are very special. They must be as different as possible from cell patterns preceding the sync character in the data stream. In this way the reliability of synchronization is enhanced.

In any system, such as that of Leis, that employs two copies of the same sync pattern in different fields, there is a chance that one field will be mistaken for the other during operation, with very deleterious results. For example, in the system of Leis a false detection of a DC erase area and a preamble preceding the header can occur. When a subsequent data sync character is detected, the controller can mistakenly interpret it as a header sync character, believe that it is operating on a header, and interpret user data as address information. Such a mistake could cause incorrect operation or additional delay in establishing correct synchronization.

SUMMARY OF THE INVENTION

In light of the problems described above, it is an object of the present invention to enhance the correct identification of different fields in a data stream without sacrificing the reliability of synchronization. The invention is a method and apparatus employing different sync patterns to achieve synchronization to different fields. When a particular field is desired to be read, the sync pattern associated with the field is searched for in order to synchronize to and identify the field. Then the field is read. This technique has the advantage of better identifying the associated field than synchronization techniques that use a single sync pattern. However, the sync patterns are chosen so that they can still be reliably detected; i.e., each is very distinct from the cell patterns preceding the sync character in the data stream.

Two robust synchronization patterns have been found that can be used to carry out the synchronization method. These patterns are such that there is a minimum distance of 10 between a sync character being sought and cell patterns in the neighborhood of the other sync character (i.e., they differ by at least 10 cells). And in a preferred embodiment of the synchronization method, the minimum distance is 13. The patterns are suitable for use with data codes having run-length constraints as wide as $d=1$ and $k=7$.

The invention has the feature that it may rely on the establishment of the preamble phase to reduce the amount of work needed for sync detection. Since the sync characters can begin only at fixed positions relative to the phase of the preamble, only those series of data cells beginning at such positions need to be checked against the sync character being sought. This feature has the advantage of either decreasing the time required for sync detection or reducing the amount of logic required, or both.

Additionally, the inventive apparatus detects multiple synchronization characters without significantly more logic than current synchronization detectors use. In addition, the apparatus has controllable features that enable it to detect other patterns that are used in the storage device. A pattern selector feeds the searching logic, so that multiple patterns can be easily detected. The pattern selector can be easily extended to allow more patterns to be searched for.

BRIEF DESCRIPTION OF THE DRAWING

An embodiment of the invention will be described with reference to the accompanying drawings, in which.

DETAILED DESCRIPTION

Figure 1:
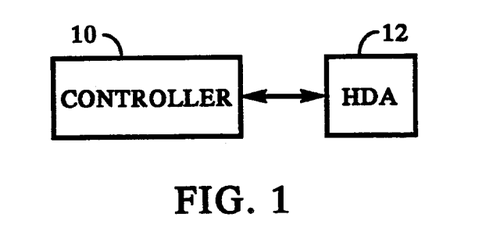
FIG. 1 is a simplified block diagram of a data storage device according to the principles of the invention.

FIG. 1 shows a simplified block diagram of a disk drive, which is a particular type of data storage device. A controller 10 is connected to a head-disk assembly or HDA 12 in a conventional fashion. The controller 10 is typically connected, by means not shown in FIG. 1, to an input/output bus in a computer system in order to effect data transfer between a disk within the HDA 12 and a memory in the computer system. The controller 10 is typically a circuit board containing analog and digital circuitry that enable it to control the functions carried out by the disk drive. The HDA 12 consists of one or more annular disks having recording surfaces upon which data is recorded, a record/playback head associated with each recording surface, and circuitry to transfer serial data to and from the controller 10.

Figure 2A:
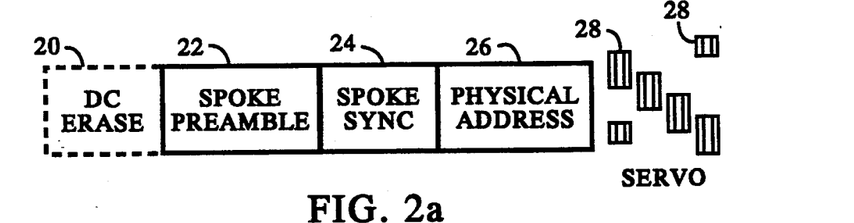
FIGS. 2a and 2b illustrate the format of a disk within the storage device of FIG. 1.
Figure 2B:
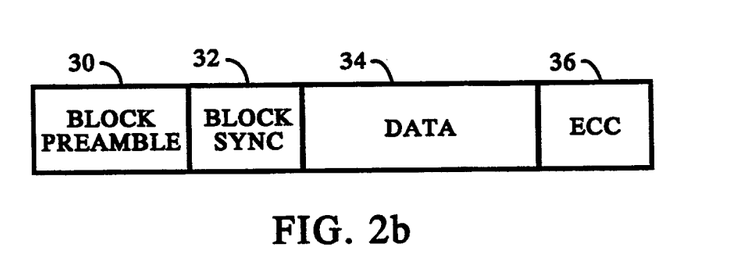

The recording surfaces of the disks in the HDA 12 are divided in a conventional fashion into concentric tracks wherein data is recorded. FIGS. 2a and 2b show the format of two different fields that are found on each track. FIG. 2a shows the format of a particular type of header field known as a "spoke" because it is recorded in radially-extending areas on the disk resembling wheel spokes. FIG. 2b shows the format of a different field called a "block" because it contains a large block of user data.

In FIG. 2a, DC Erase area 20 is an area of at least 40 cells in length where no flux transitions have been recorded; it is used to separate a spoke from a preceding block. In alternative embodiments, the length of the DC Erase area 20 may be either shorter or longer as required. The spoke preamble 22 is a binary pattern that is used conventionally as a reference for a phase-locked loop within the controller 10 of FIG. 1. The phase-locked loop in turn is used to sample the remaining fields in the spoke. The particular pattern used for the spoke preamble 22 is the encoded pattern 0101 . . . 01 having a minimum length of 22 cells; the preamble length may also be different in alternative embodiments. The spoke synchronization or spoke sync pattern 24 is a unique binary pattern, described more fully below, that is used by the controller 10 to determine the boundaries of the physical address field 26 and the servo bursts 28. The physical address field 26 contains information identifying the track, sector, and record/playback head. Servo bursts 28 are used by a head positioning servo controller in the controller 10 to maintain alignment between the record/playback head and the track. The various fields shown in FIG. 2a are only written during an otherwise-conventional process of formatting the disks in the HDA 12 prior to operation by a user.

While the spoke preamble 22 in the illustrated embodiment is the encoded pattern 0101 . . . 01, there are other possible preamble patterns. The preamble can be thought of as multiple repetitions of a predetermined cell pattern. In the illustrated case, this predetermined pattern is "01". But it may also be possible, for example, to have a predetermined pattern of three cells, such as "001". In that case the spoke preamble 22 would be 001001 . . . 001. As will be described, the choice of preamble affects both the selection of sync patterns and the implementation of associated sync detector logic.

The block format, shown in FIG. 2b, contains a block preamble 30 which in the illustrated embodiment is the same as the spoke preamble 22. The block sync pattern 32 functions analogously to the spoke sync pattern 24 but differs in significant ways to be described presently.

The data field 34 contains a large block, for example 512 bytes, of user data. The data field 34 is protected by an error-correcting code (ECC); the redundancy or check bits associated with the ECC are stored in the ECC field 36. Unlike the fields of FIG. 2a, the various fields in FIG. 2b are written during normal use of the storage device of FIG. 1.

The data field 34 and ECC field 36 shown in FIG. 2b are encoded by a rate-$\frac{2}{3}$ tree code used by Digital Equipment Corporation in its disk products. This code is described in U.S. Pat. No. 4,503,420 issued Mar. 5, 1985 to Rub et al. and entitled "Arrangement for Encoding and Decoding Information Signals", incorporated by reference herein. The code has run-length constraints of $d=1$ and $k=7$, which means that in the encoded data stream there must be at least 1 and at most 7 ZEROs separating two ONEs (where an encoded ONE corresponds to a flux transition on the disk, and an encoded ZERO corresponds to no flux transition). The spoke preamble 22, spoke sync 24, block preamble 30, block sync 32, data field 34, and ECC field 36 all satisfy the above-described run-length constraints.

Figure 3A:
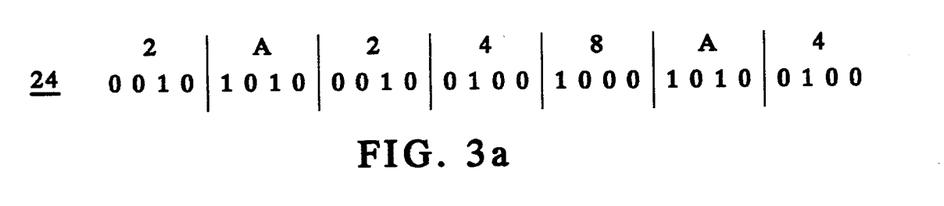
FIGS. 3a and 3b show synchronization patterns that are part of the format shown in FIGS. 2a and 2b.
Figure 3B:
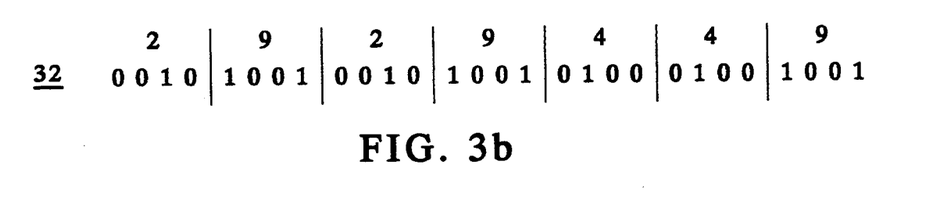

The patterns used for the spoke sync 24 and block sync 32 are shown in FIGS. 3a and 3b, respectively. The spoke sync pattern 24 is hex 2A248A4, and the block sync pattern 32 is hex 2929449. These patterns satisfy the run-length constraints of the above-mentioned code. More significantly, they are quite different from each other, differing in 13 cell positions. This difference is exploited by the controller 10 to achieve robust synchronization in a manner to be described.

One feature of the spoke sync pattern 24 shown in FIG. 3a is that it ends with a ZERO. Therefore the physical address field 26, which follows the spoke sync 24, is free to start with a ONE without violating the minimum run-length constraint $d=1$. This is useful if the physical address field 26 is not encoded or is encoded differently from the data field 34. It is preferred however that the physical address field 26 satisfy the run-length constraints of the data code. In contrast to the spoke sync pattern 24, the block sync pattern 32 ends with a ONE. This presents no problem, however, because the data field 34 is encoded according to the $d=1$, $k=7$ constraints, and therefore the first encoded cell following the last cell of the sync will not be a one. Therefore, the minimum run-length constraint is met automatically by the encoder despite the ONE at the end of the block sync pattern 32 shown in FIG. 3b.

Figure 4:
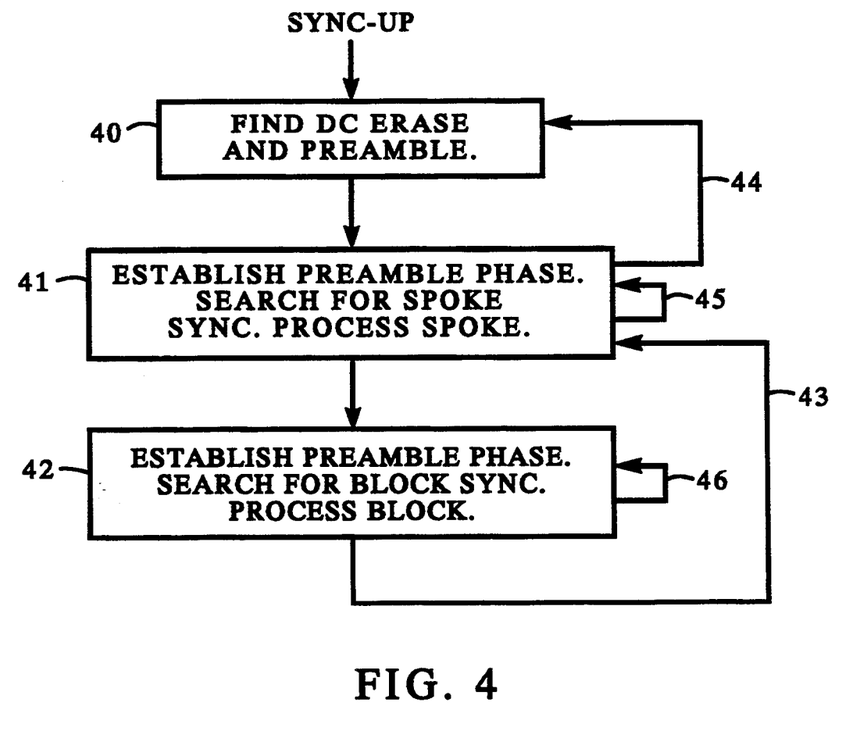
FIG. 4 is a flow diagram showing a method of attaining synchronization during operation of the data storage device of FIG. 1.

FIG. 4 is a flow diagram showing how synchronization operations of the controller 10 are carried out. Whenever the controller 10 needs to establish rotational synchronization from a non-synchronized state (called the "sync-up" mode), it searches for DC Erase and preamble in block 40. Sync-up may be required, for example, after a head switch or during power-up. As already mentioned, the DC Erase area 20 is an area where no flux transitions have been recorded. In the illustrated embodiment, DC Erase is declared to be found when a series of 20 cell pairs (40 cells) has fewer than 4 cell pairs where transitions appear. One skilled in the art will realize that thresholds other than 4 may be used; the threshold is selected to optimize the probability of detection of DC Erase. If a smaller threshold is used, more DC Erase patterns 20 may be incorrectly skipped due to otherwise harmless noise or media defects. Conversely, a larger threshold is more forgiving of errors, but may yield more false indications of DC Erase 20.

After DC Erase has been found in block 40, a preamble is then sought. If DC Erase 20 has been correctly identified, then the preamble that is found is the spoke preamble 22. However, it is possible under some conditions that the preamble found in block 40 is actually the block preamble 30. This is an erroneous situation that will be detected when sync detection fails, as is described in more detail below. In any event, the preamble is declared to be present when a series of 12 cells has more than 4 ONEs. This 4-out-of-12 threshold, like that of DC Erase 20, may also be varied. After the presence of the preamble is established, the phase-locked loop in the controller 10 is allowed to phase-lock to the preamble.

In block 41, the controller 10 processes the spoke shown in FIG. 3a. Block 41 is entered from block 40 during sync-up, and also from block 42 along path 43 whenever a new spoke is encountered after rotational synchronization has been established. First, the preamble phase is established by conventional means, and the cell positions having ZEROS are denoted as EVEN. This is done to simplify sync detection, which then proceeds. The search method used in block 41 is described more fully with reference to FIG. 5 below.

Figure 5:
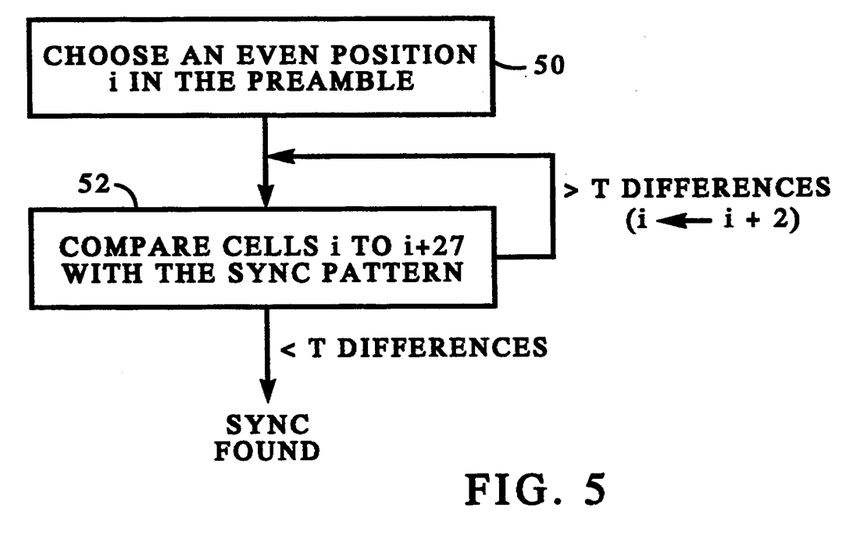
FIG. 5 is a flow diagram showing a general method of detecting a synchronization pattern in a serial data stream produced during the operation of the data storage device of FIG. 1.

Since the spoke sync pattern 24 can only start at EVEN positions, only cell patterns beginning at EVEN positions are searched. In alternative embodiments the sync pattern 24 might start at ODD positions, in which case only cell patterns beginning at ODD positions would be searched. This technique can also be extended to work with preambles having longer predetermined cell patterns. In such cases, the spoke sync pattern 24 would begin at a cell position that corresponds to a predetermined position in the cell pattern of the preamble, and only cell patterns beginning at that predetermined position would need to be searched. For the example of a three-cell pattern such as "001", the spoke sync pattern 24 might start at a cell position that is a multiple of 3 away from the first ZERO in the pattern.

When the spoke sync pattern 24 has been found in block 41, the timing boundaries of the physical address 26 and servo bursts 28 become known, so that synchronization to the spoke is established. The controller 10 then starts to collect samples of the physical address 26 and servo bursts 28 of FIG. 2a at the correct times. The sampled values are used by the controller 10 to conduct operations that are otherwise unrelated to the present invention. Sampling and other operations are collectively referred to as "process spoke" in block 41 of FIG. 4.

If spoke sync 24 is successfully found in block 41 and the controller 10 needs to process a block to be encountered before the next spoke, it proceeds to block 42. However, if spoke sync 24 is not found before a timeout occurs, then something else happens. If the controller 10 is in sync-up mode, it returns along path 44 to block 40 to attempt to find DC Erase 20 and preamble 22 again. If the controller 10 is not in sync-up mode, it merely loops back to block 41 along path 45 to wait for the next spoke. In either case, the sync time-out is noted by a microcontroller in the controller 10 for conventional error-monitoring purposes. The controller also proceeds along path 45 if it does not need to process any upcoming blocks.

In the case mentioned above where DC Erase 20 is falsely indicated, the search for spoke sync in block 41 will probably fail because the controller 10 is searching in the neighborhood of block sync 32. Therefore, the controller in block 41 merely times out rather than erroneously processing the spoke. The practical effect is that spoke sync 24 is not detected until the next spoke, which is of course a preferred result.

In block 42, the controller 10 processes the blocks that it encounters before the next spoke. The controller 10 knows approximately when to expect the block preamble 30 by measuring elapsed time since the last spoke sync 24. The preamble phase is established and the EVEN positions are denoted, as in block 41. Then the controller 10 searches for the block sync pattern 32. The controller 10 repeats step 42 (path 46) for each block that precedes the next spoke to be encountered as the disk rotates. When the next spoke is imminent, as determined by timing from the detection of spoke sync 24, the controller 10 loops back to step 41 along path 43. In this case, there is no need to execute the steps of block 40 again, because the controller 10 has already established the approximate rotational position of the disk.

If in block 42 a data block is to be written rather than read, then for that data block the steps carried out are different. In that case, the controller 10 stays in block 42 (using path 46), marking off blocks until it comes to the location where the data block is to be written. Then the block preamble 30 and block sync 32 are written to the disk along with the data 34 and ECC 36. The controller 10 then continues to loop along path 46 until the end of the spoke.

FIG. 5 shows how a sync pattern is detected in blocks 41 and 42 of FIG. 4. Once the EVEN preamble positions have been established, sync detection begins at an EVEN position chosen in block 50 and denoted as i. In block 52, cells i to i+27 are compared with the sync pattern being sought, either spoke sync 24 or block sync 32. The number of differing positions is tallied. If there are more than T differences, where T is a threshold value between 0 and 6 in the illustrated embodiment, then the sync pattern has not been found. In this case, i is incremented by two and block 52 is repeated for the set of 28 cells beginning at the next EVEN position. If in block 52 there are T or fewer differences, then sync has been found.

The threshold T used in block 52 is preferably an even number so that the algorithm of FIG. 5 is capable of tolerating T/2 peak shifts. Also, other ranges of the threshold T may be appropriate if the technique of FIG. 5 is used with sync patterns other than those shown in FIGS. 3a and 3b. As is discussed below in reference to FIG. 6, the upper limit for the threshold T is (D-1)/2 where D is the minimum distance between the different sync patterns being searched for.

It should be noted that the comparison in block 52 normally begins during the preamble. Therefore the sync patterns, in addition to being as distinct as possible from each other, should also be quite different from all possible patterns of 28 consecutive cells starting at any even position in the preamble (including patterns consisting of the tail end of the preamble and the leading part of the sync pattern) in order to avoid a false sync indication during the preamble. In the illustrated embodiment, the spoke sync pattern 24 differs from the spoke preamble 22 in 19 places, and the block sync pattern 32 differs in 14 places.

Table 1 shows a table of distance characteristics found for the sync patterns shown in FIGS. 3a and 3b and the preamble 0101 . . . 01.

TABLE 1

| CASE | DISTANCE | | | | | | | | | | |
|---|---|---|---|---|---|---|---|---|---|---|---|
| | ≦9 | 10 | 11 | 12 | 13 | 14 | 15 | 16 | 17 | 18 | 19 |
| Spoke/Spoke | 0 | 0 | 0 | 0 | 3 | 1 | 3 | 1 | 1 | 2 | * |
| Spoke/Block | 0 | 0 | 0 | 0 | 2 | 2 | 2 | 0 | 3 | 2 | * |
| Block/Spoke | 0 | 2 | 0 | 0 | 2 | * | 3 | 2 | 1 | 1 | 1 |
| Block/Block | 0 | 0 | 0 | 0 | 2 | * | 3 | 3 | 0 | 2 | 0 |

Table 1 is to be read as follows: Each row represents one of four possible cases of (pattern searching for) / (neighborhood actually searching). Thus the second row, for example, represents the case of searching for the spoke sync pattern 24 in the neighborhood of the block sync 32 in the data stream. Sync detection under such circumstances is of course erroneous, and Table 1 is meant to highlight that the chance of falsely detecting sync is very small.

Each column in Table 1 corresponds to a distance, or a number of cell positions in which patterns differ. Each entry therefore represents the number of out-of-sync patterns in the neighborhood being searched that are the indicated distance from the pattern being searched for. For example, in the case of searching for the block sync pattern 32 in the neighborhood of spoke sync 24 (third row in Table 1), 3 out-of-sync patterns exist that are distance 15 from the block sync pattern 32.

The "*" entries in Table 1 correspond to cases where at least one of the out-of-sync patterns having the specified distance is the preamble. As the preamble is made longer, the number of such patterns encountered during the search increases.

Table 1 shows that in all cases there are no out-of-sync patterns having distance less than 10; and only one case, Block/Spoke, has any patterns having distance less than 13. This indicates that the two sync patterns shown in FIGS. 3a and 3b can be distinguished from each other even in the presence of 6 cell errors in all cases except Block/Spoke, which can tolerate only 4 errors. In the preferred embodiment of the invention, spoke sync 24 must be found before block sync 32 is searched for. As a result, the Block/Spoke case can only arise if there is a preceding erroneous finding of spoke sync 24 or a preceding erroneous failure to find block sync 32. Table 1 shows that such erroneous operation can occur only if there are more than 6 cell errors. Therefore, in the preferred embodiment, the threshold T can be set as high as 6 when searching for either spoke sync 24 or block sync 32. Of course, in embodiments that search for block sync 32 in a more random fashion, a maximum threshold of 4 should be used.

Figure 6:
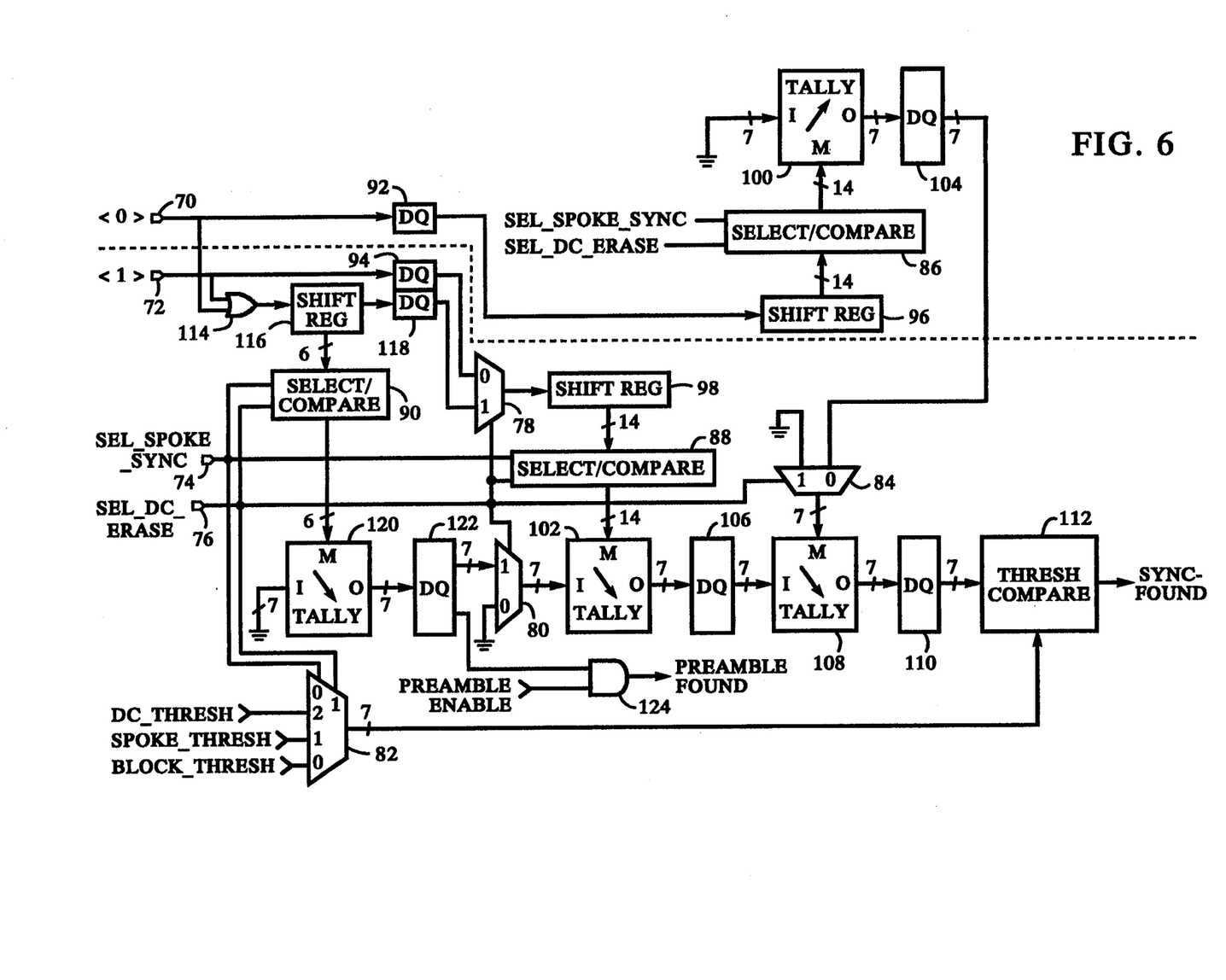
FIG. 6 is a block diagram of a synchronization detector used to detect the synchronization patterns of FIGS. 3a and 3b.

FIG. 6 is a block diagram of a sync detector in the controller 10 that performs several sync-related functions to be described. As shown, the data stream has been split into two data streams, one having only EVEN cells and the other having only ODD cells. All of the storage elements appearing in FIG. 6 are clocked at ½ the raw cell rate. Each clock cycle, a pair of adjacent EVEN and ODD cells in the data stream from the HDA 12 appears at terminals 70 and 72, respectively. The upper half of FIG. 6 operates upon the EVEN cells in the same way that the lower half operates on the ODD cells except where noted below.

The illustrated technique of splitting the data stream is useful to relax the timing constraints of the circuit while accommodating high data rates, and can be either discarded or extended as required. For the example of a preamble having a 3-cell predetermined cell pattern, it may be advantageous to employ three similar circuits to operate on first, second, and third adjacent cells in the data stream simultaneously. In such a system, the OR gate 114 would likely be a 3-input OR gate; also, an additional combining tally circuit would be needed. Alternatively, other embodiments could employ only one circuit to operate on all the cells, and dispense with the OR gate 114 and combining circuitry.

Two control signals SelSpokeSync and Sel DC Erase are applied at terminals 74 and 76, respectively. These control signals are supplied by a microcontroller within the controller 10 executing the method of FIG. 4. The control signals indicate which operation is to be performed according to Table 2:

TABLE 2

| Sel_Spoke_Sync | Sel_DC_Erase | Operation |
|---|---|---|
| 0 | 0 | Search for Block Sync |
| 0 | 1 | Search for DC Erase or Preamble |
| 1 | 0 | Search for Spoke Sync |
| 1 | 1 | (unused) |

Note from Table 2 that SelDCErase is used for detection of both DC Erase and preamble. This is more fully described below.

The operation of the sync detector of FIG. 6 when searching for Block Sync will now be described. In this case, the states of SelSpokeSync and Sel DC Erase are both ZERO. As a result, all of the multiplexers 78, 80, 82, and 84 have their "0" inputs selected. Also, in the Select/Compare blocks 86, 88, and 90 the block sync pattern 32 is selected (this is described in more detail below with reference to FIG. 8). The data cells are clocked into flip-flops 92, 94 and subsequently into 14-stage shift registers 96, 98. Each cycle, the Select/Compare blocks 86, 88 compare the 14-bit values stored in the shift registers 96, 98 with the EVEN and ODD cells, respectively, of the block sync pattern 32. The result of each comparison is a 14-bit value which has a ONE in each matching position and a ZERO in each non-matching position.

The results of the comparison go to the tally circuits 100, 102 where the number of mismatching cells is calculated. In the illustrated embodiment, the tally circuits 100, 102 are identical; they are described in greater detail with reference to FIG. 7 below. As shown in FIG. 6, the tally circuits 100, 102 have three multi-bit ports: an input port I, a match port M, and an output port O. The tally circuits 100, 102 propagate ONEs in the directions indicated by the arrows. ONEs appear on outputs 0 to k of the output port O of a tally circuit 100, 102 when k inputs on its input port I are ONE. Both tally circuits 100, 102 have seven rows and seven corresponding outputs numbered 0 through 6, because 6 is the maximum threshold for mismatches. In an embodiment having a different maximum threshold, the tally circuits 100, 102 would have correspondingly different numbers of rows and outputs.

The EVEN and ODD tallies pass through flip-flops 104, 106 and are tallied in combining tally circuit 108. The combining tally circuit 108 is the same as tally circuits 100 and 102, except that it has only 7 columns and 7 inputs on its match port M. The output passes through flip-flops 110 into threshold comparing circuit 112, which asserts the signal SyncFound when the overall mismatch tally is less than the threshold value selected by multiplexer 82. The threshold values may be provided to the multiplexer 82 by any of several means;

the use of programmable registers within the controller 10 of FIG. 1 is particularly beneficial.

The operation of the sync detector of FIG. 6 when searching for spoke sync 24 is almost identical to that described above for block sync 32. When searching for spoke sync 24, however, the threshold multiplexer 82 has its "1" input selected, and the Select/Compare blocks 86, 88, and 90 select the spoke sync pattern 24 instead of the block sync pattern 32. In all other respects the operation is the same as that for detection of block sync 32.

The operation of the sync detector of FIG. 6 when searching for DC Erase will now be described. As will be shown, this operation is confined to elements in the lower half of FIG. 6. In this case, the threshold multiplexer 82 has its "2" input selected, and multiplexers 78, 80, and 84 have their "1" inputs selected. The Select/Compare blocks 86, 88, and 90 select the DC Erase pattern, which is all ZEROs. The EVEN and ODD cells are OR'd together in OR gate 114 and fed into the 6-bit shift register 116. The output from shift register 116 passes through flip-flip 118 into shift register 98; in that sense, the two shift registers 116 and 98 are concatenated to form a long (20-bit) shift register. Since the EVEN and ODD bits are OR'd together before entering the shift register 114, this 20-bit shift register contains information about 40 contiguous cells.

It should be noted that the OR'ing of EVEN and ODD bits is an optimization that is possible because of the d=1 coding constraint. Alternative embodiments may forego the OR gate and examine each cell independently. Alternatively, it may be possible to OR together more adjacent bits. For the example of a 100100...100 preamble, three adjacent bits can be OR'd together.

Select/Compare block 90 compares the output of shift register 116 with ZEROs and the results are tallied in the tally circuit 120, which is similar to the other tally circuits shown in FIG. 6. The tallies pass through flip-flops 122 where they are combined with the comparison results from the other 14 bits. The overall tally then passes through flip-flops 106 and combining tally circuit 108, which in this case does not modify the tally because its upper input is all ZEROs. From this point forward, operation is the same as for detection of spoke sync 24 or block sync 32, except that the assertion of "SyncFound" means that DC Erase has been found.

When the sync detector of FIG. 6 is searching for either spoke preamble 22 or block preamble 30, it is set up to function as though it were searching for DC Erase; i.e., SelDCErase is asserted. However, in this case the sync detector is looking for 4 ONEs in a series of 12 cells. Since the Select/Compare block 90 is comparing the output of shift register 116 with a pattern of ZEROs, it generates ONEs in all the positions where there are ONEs in the shift register 116. These are tallied in the tally circuit 120 and fed to flip-flips 122. At this point, the fifth tally signal (which indicates that 4 ONEs have been detected) is routed to AND gate 124, which asserts PreambleFound when this fifth tally signal and PreambleEnable are both ONE. Preamble Enable also comes from a microcontroller within the controller 10, and is asserted during the preamble search.

Figure 7:
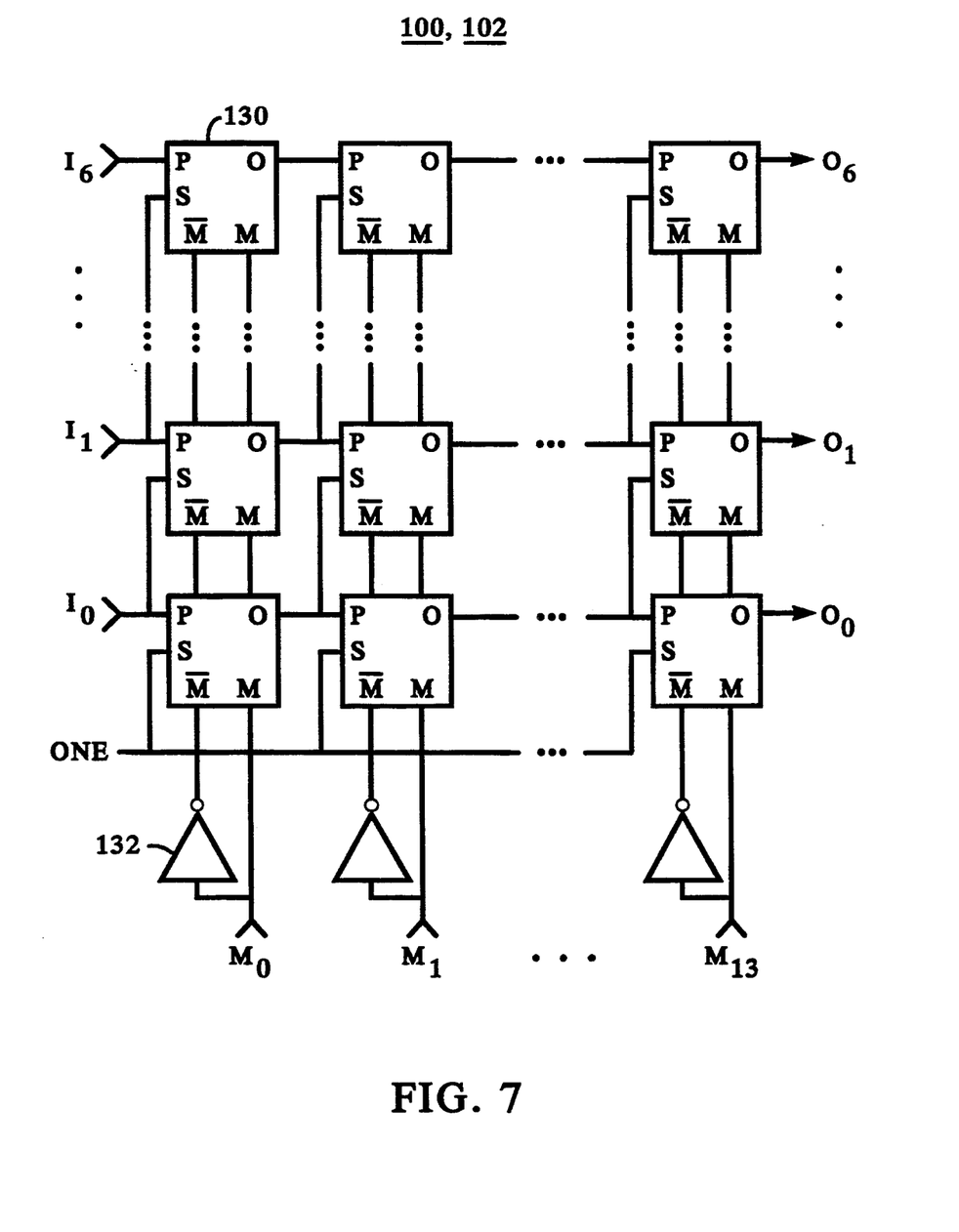
FIG. 7 is a schematic diagram of tally circuits of FIG. 6.

FIG. 7 shows the tally circuits 100, 102 of FIG. 6 in greater detail. The tally circuits 100, 102 are constructed in a known manner as arrays of cells 130 connected as shown. A row of inverters 132 provides an inverted copy of the match port M to the array. Each cell 130 has output O, pass input P, shift input S, and match inputs M and not M, and performs the following logic function:

O = [M AND S] OR [(not M) AND P]

This function will be readily recognized as that of a multiplexer; it is implemented in a conventional manner by pass transistors or other logic within the cells 134. Note that the cells 134 in the bottom row all have their shift inputs S tied to ONE, so that a match in a given column introduces a ONE in the bottom row as well as shifting the output of the previous column by one position.

Figure 8:
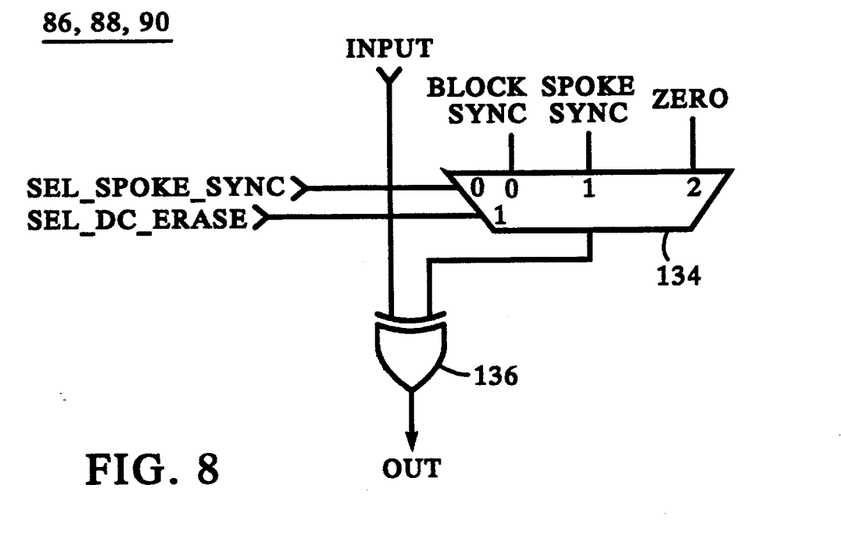
FIG. 8 is a schematic diagram of a Select/Compare block of FIG. 6.

FIG. 8 shows the detail of the Select/Compare blocks 86, 88, and 90. A one-bit slice is shown; it is to be understood that this logic is repeated to give the required width. A 3:1 multiplexer 134 is used to select one of the predetermined patterns to be used for comparison. The output from the multiplexer 134 goes to XOR gate 136, which generates a ONE output when the input differs from the selected pattern. It is to be understood that the logic of FIG. 8 is shown functionally, and that many common variations exist to give the same result. In particular, alternative embodiments can take advantage of the known ZERO pattern for DC erase to simplify the comparison function, because comparing an input to ZERO is equivalent to passing the input to the output. Also, the Select/Compare block 90 of FIG. 6 need not have the multiplexer 134 because it is not involved in the detection of either spoke sync 24 or block sync 32. Finally, the XOR gate 136 can be implemented in several ways known to those skilled in the art.

It should also be noted that the multiplexer 134 could be replaced in alternative embodiments with other selection means, such as a programmable register, register file, or even a memory array. Such configurations might be advantageous if the sync detector is used to detect many more than two or three patterns.

Figure 9:
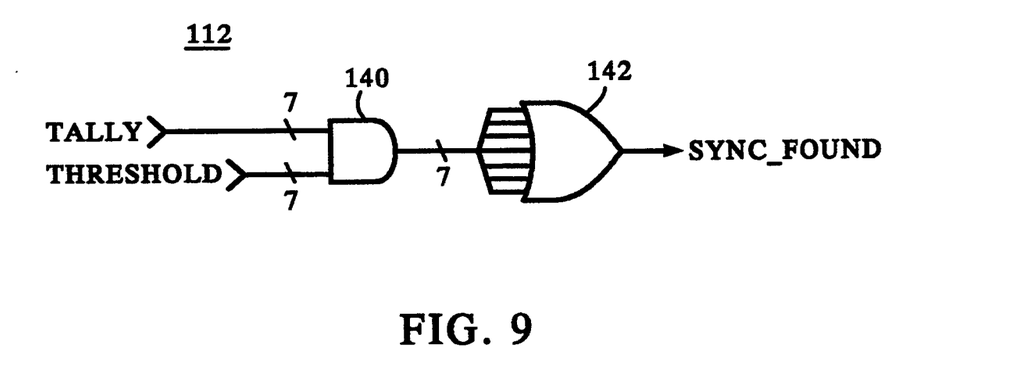
FIG. 9 is a schematic diagram of a threshold compare block of FIG. 6.

FIG. 9 shows the arrangement of the threshold comparison block 112 of FIG. 6. The AND-OR circuit consisting of AND gates 140 and OR gate 142 acts as a 7:1 multiplexer that selects one bit of the tally input. If the selected input is high, then SyncFound is asserted. It is to be understood that there are also several alternative implementations of the threshold comparison block 112 that are known to those skilled in the art.

What is claimed is:

1. A method of operating a data storage device, comprising the steps of:
    selecting a first synchronization pattern of hex 2A24-8A4 to be searched for in a cell stream to be read from a storage medium in said data storage device;
    phase-locking to a preamble cell pattern of 0101 ... 01 appearing in said cell stream to establish correct cell sampling times;
    comparing a portion of said cell stream to the selected synchronization pattern;
    determining the number of positions in which the selected synchronization pattern and said portion of said cell stream differ;
    repeating said comparing and determining steps for succeeding portions of said cell stream until the number of differing positions is less than a first threshold;
    selecting a second synchronization pattern of hex 2929449 to be searched for in said cell stream; and
    repeating said phase-locking, comparing and determining steps for succeeding portions of said cell stream until the number of differing positions is less than a second threshold.

2. A method according to claim 1, wherein said first and second thresholds are the same value.

3. A method according to claim 1, wherein said first and second thresholds are even numbers.

4. A method according to claim 1, wherein said data storage device is a disk drive.

5. A method according to claim 1, further comprising the step of establishing the phase of said preamble cell pattern to reduce the number of repetitions of said comparing step.

6. A method of operating a disk drive, comprising the steps of:
   selecting a spoke synchronization pattern of hex 2A248A4 to be searched for in a cell stream to be read from a disk in said disk drive;
   phase-locking to a spoke preamble cell pattern of 0101 ... 01 appearing in a cell stream read from a disk in said disk drive to establish correct sampling times for said spoke synchronization pattern and a physical address succeeding said spoke preamble cell pattern in said cell stream;
   comparing a portion of said cell stream to the selected synchronization pattern;
   determining the number of positions in which the selected synchronization pattern and said portion of said cell stream differ;
   repeating said comparing and determining steps for succeeding portions of said cell stream until the number of differing positions is less than a first threshold;
   reading said physical address;
   selecting a block synchronization pattern of hex 2929449 to be searched for in said cell stream;
   phase-locking to a block preamble cell pattern of 0101 ... 01 appearing in said cell stream to establish correct sampling times for said block synchronization pattern and user data succeeding said block preamble cell pattern in said cell stream, said block preamble, block synchronization pattern, and user data being recorded at approximately a predetermined location on said disk with respect to said spoke synchronization pattern;
   repeating said comparing and determining steps for succeeding portions of said cell stream until the number of differing positions is less than a second threshold; and
   reading said user data.

7. A method according to claim 6, further comprising the step of:
   searching for a DC Erase Pattern preceding said spoke preamble in said cell stream to find the beginning of said spoke preamble.

8. An apparatus, comprising:
   means for selecting one of different synchronization patterns to be searched for in a cell stream to be supplied to said apparatus;
   a pair of shift registers to respectively receive EVEN and ODD portions of said cell stream;
   means for comparing the contents of said shift registers with corresponding EVEN and ODD portions of the selected synchronization pattern;
   a pair of tally circuits coupled to said comparing means to tally the numbers of EVEN and ODD cell mismatches indicated thereby;
   a combining tally circuit coupled to said pair of tally circuits to tally the total number of cell mismatches indicated thereby; and
   a threshold comparing circuit coupled to said combining tally circuit to indicate when the total number of cell mismatches indicated thereby exceeds a threshold.

9. An apparatus according to claim 8, wherein said selecting means comprises multiplexers having inputs hard-wired to represent said synchronization patterns.

10. An apparatus according to claim 8, wherein said comparing means comprises XOR gates.

11. An apparatus according to claim 8, wherein said threshold comparing circuit comprises an AND-OR circuit.

12. An apparatus according to claim 8, further comprising:
    means for searching for a DC Erase pattern preceding one of said synchronization patterns in said cell stream.

13. An apparatus according to claim 12, wherein said DC Erase pattern searching means comprises:
    an OR gate having coupled thereto EVEN and ODD portions of said cell stream to indicate whether at least one of an adjacent pair of EVEN and ODD cells is a ONE;
    a pair of shift registers concatenated to form one long shift register coupled to said OR gate to receive the indication therefrom;
    a tally circuit coupled to said long shift register to detect the number of ONEs therein; and
    a threshold comparing circuit coupled to said tally circuit to indicate when the total number of ONEs indicated thereby exceeds a predetermined DC Erase threshold.

14. An apparatus according to claim 8, further comprising means for searching for a preamble pattern preceding one of said synchronization patterns in said cell stream.

15. An apparatus according to claim 14, wherein said preamble pattern searching means comprises:
    an OR gate having coupled thereto EVEN and ODD portions of said cell stream to indicate whether at least one of an adjacent pair of EVEN and ODD cells is a ONE;
    a shift register coupled to said OR gate to receive the indication therefrom;
    a tally circuit coupled to said shift register to detect the number of ONEs therein; and
    an AND gate coupled to said tally circuit and having coupled thereto a PreambleEnable signal to indicate that said preamble pattern has been found when said PreambleEnable signal is asserted and the number of ONEs indicated by said tally circuit is at least a threshold.

16. An apparatus according to claim 15, wherein said shift register is a 6-bit shift register and said threshold is four.

17. A disk drive, comprising:
    a head-disk assembly having a disk whereupon is recorded a physical address, user data, a first synchronization pattern associated with said physical address, and a second synchronization pattern different from said first synchronization pattern and associated with said user data;
    means for selecting one of said first and second synchronization patterns to be searched for in a cell stream to be read from said disk;

a pair of shift registers to respectively receive EVEN and ODD portions of said cell stream;

means for comparing the contents of said shift registers with corresponding EVEN and ODD portions of the selected synchronization pattern;

a pair of tally circuits coupled to said comparing means to tally the numbers of EVEN and ODD cell mismatches indicated thereby;

a combining tally circuit coupled to said pair of tally circuits to tally the total number of cell mismatches indicated thereby; and a threshold comparing circuit coupled to said combining tally circuit to indicate when the total number of cell mismatches indicated thereby exceeds a threshold.

* * * * *